United States Patent [19]

Aimone et al.

[11] Patent Number: 5,056,378
[45] Date of Patent: Oct. 15, 1991

[54] ENGINE VALVE CONTROL DURING TRANSMISSION SHIFTS

[75] Inventors: Michael G. Aimone, Westland; Julian A. LoRusso, Woodhaven; William E. Tobler, Willis, all of Mich.

[73] Assignee: Ford Motor Company, Dearborn, Mich.

[21] Appl. No.: 413,642

[22] Filed: Sep. 28, 1989

[51] Int. Cl.[5] .............................................. B60K 41/06
[52] U.S. Cl. ..................................... 74/858; 74/872; 123/90.16
[58] Field of Search ............... 123/90.15, 90.16, 90.12; 74/858, 860, 872, 874, 857, 859

[56] References Cited

U.S. PATENT DOCUMENTS

| | | | |
|---|---|---|---|
| 4,226,141 | 10/1980 | Espenschied | 74/858 |
| 4,403,527 | 9/1983 | Mohl et al. | 74/851 |
| 4,474,081 | 10/1984 | Kinugasa et al. | 74/859 X |
| 4,494,506 | 1/1985 | Hayama et al. | 123/348 |
| 4,572,114 | 2/1986 | Sickler | 123/21 |
| 4,585,101 | 4/1986 | Danno | 123/90.16 X |
| 4,630,583 | 12/1986 | Suzuki et al. | 123/425 |
| 4,688,450 | 8/1987 | Hayashi et al. | 74/858 X |
| 4,696,265 | 9/1987 | Nohira | 123/90.16 |
| 4,724,723 | 2/1988 | Lockhart et al. | 74/858 X |
| 4,759,321 | 7/1988 | Matsumoto et al. | 123/90.15 |
| 4,800,781 | 1/1989 | Yasue et al. | 74/860 |
| 4,843,914 | 7/1989 | Koike | 74/858 |
| 4,889,014 | 12/1989 | Iwata | 74/858 |
| 4,890,515 | 1/1990 | Taniguchi et al. | 74/872 X |
| 4,926,636 | 5/1990 | Tadokoro et al. | 74/860 X |

OTHER PUBLICATIONS

SAE Paper No. 880602, entitled "An Integrated, Full Authority, Electro Hydraulic Engine Valve and Diesel Fuel Injection System", by J. E. Mardell and R. K. Cross, dated Feb. 29–Mar. 4, 1988.

Primary Examiner—Dwight Diehl

[57] ABSTRACT

An engine valve control system for controlling engine valve lift during an automatic transmission shift. A plurality of engine valve actuation systems are each coupled to an individual engine valve for electronically controlling valve lift. Each valve actuation system includes a hydraulically operated piston coupled to each of the engine valves, and an electronically actuated supply valve responsive to a supply signal and coupled between the hydraulically operated piston and a source of hydraulic fluid, and an electronically actuated drain valve responsive to a drain signal and coupled between the piston and source of hydraulic fluid. A controller responsive to a shift command from a transmission controller, provides the supply and drain signals in appropriate timing and phase relationship to reduce valve lift during the automatic transmission shift. In another aspect of the invention, the controller also reduces the hydraulic coupling force applied to the clutch elements during an automatic transmission shift.

7 Claims, 7 Drawing Sheets

FIG. 7A SHIFT COMMAND

FIG. 7B PERCENT LIFT CAMMAND

FIG. 7C PERCENT PRESSURE CAMMAND

FIG. 7D ENGINE TORQUE

FIG. 7E APPLIED PRESSURE

FIG. 7F CLUTCH TORQUE

DRIVESHAFT TORQUE
FIG. 7G

DRIVESHAFT JERK
FIG. 7H

FIG. 7I CLUTCH WORK $t_x$  $t_y$

ENGINE VALVE CONTROL DURING TRANSMISSION SHIFTS

BACKGROUND OF THE INVENTION

The field of the invention relates to control of a motor vehicle drivetrain during an automatic transmission shift.

Automatic transmissions typically include multiple clutches coupled to planetary gears for gear ratio selection. During a shift, the friction elements of a selected clutch gradually become engaged for transferring torque through a desired gear ratio. As is well known, initial torque transfer occurs during a slippage phase of the friction elements. These elements are designed with sufficient mass and surface area for dissipating the friction heat generated during the slippage phase.

The inventors herein have recognized that recent developments in high speed, high power engines, such as four valve per cylinder engines, result in more heat than conventional friction elements can adequately dissipate during automatic transmission shifts. New transmissions with larger friction elements could be designed to dissipate this excessive heat, however, the additional packaging area required would be prohibitive.

Although engine control strategies are known to reduce shift shock, these strategies are not suitable to address the problem of excessive friction heat build up during high speed shifts utilizing high output engines. For example, U.S. Pat. No. 4,403,527 issued to Mohl et al discloses a control unit for retarding ignition spark during a shift to reduce undesired jolts and resulting wear of the friction elements commonly known as shift shock. Reducing fuel supplied by electronic fuel injectors to reduce shift shock is also disclosed. U.S. Pat. No. 4,800,781 issued to Yasue et al also discloses retarding ignition timing to reduce shift shock and U.S. Pat. No. 4,226,141 also discloses reducing fuel to reduce shift shock.

These prior approaches however do not, and can not, address the problem of excessive friction heat generated during high speed shifts utilizing a high output engine. More specifically, spark timing can only reduce engine torque output by approximately 25% (see The Internal Combustion Engine in Theory and Practice, Volume 1, MIT Press, 1980, by Taylor) whereas a reduction in excess of 50% may be required to couple a high output engine to a conventional transmission. Further, the incomplete combustion resulting from maximum spark retard may result in excessive exhaust heat and damage to the catalytic converter (see U.S. Pat. No. 4,800,781 issued to Yasue et al at lines 36-55 of column 1). Fuel injection control has also been found to be unsatisfactory due to the time delay for an air/fuel charge to be inducted through an intake manifold into the engine.

SUMMARY OF THE INVENTION

The above object and others are achieved, and disadvantages of prior approaches overcome, by providing an apparatus for controlling a drivetrain during an automatic transmission shift. In one particular aspect of the invention, the apparatus comprises: a plurality of actuation means each coupled to an individual engine valve for electronically controlling valve lift in relation to a value of a valve command signal (valve lift is herein defined as valve displacement and/or time duration of such displacement); transmission control means for providing a shift command correlated with the automatic transmission shift; and control means responsive to the shift command for providing the valve command signal having a value related to a desired reduction in valve lift during the automatic transmission shift. By hydraulically controlling engine valve lift during a transmission shift, engine torque may be reduced up to 100% if desired. An advantage is thereby obtained of reducing heat dissipated across the clutch elements to a far greater degree than heretofore possible.

In another aspect of the invention, the apparatus comprises: a plurality of actuation means each coupled to an individual engine valve for electronically controlling valve lift in relation to a valve command; a clutch controller for hydraulically coupling a clutch plate to a friction element in relation to a pressure command; transmission control means for providing a shift command correlated with the automatic transmission shift; and control means responsive to the shift command for providing the valve command to reduce valve lift during the automatic transmission shift and for providing the pressure command to reduce the coupling between the clutch plate and the friction element during the automatic transmission shift. By controlling both engine valve lift and the coupling between the clutch elements, an advantage is obtained of both reducing heat dissipated across the clutch elements to a greater degree than heretofore possible and providing a smoother transmission shift during the reduction in engine torque output.

BRIEF DESCRIPTION OF THE DRAWINGS

The objects and advantages of the present invention will be better understood by reading the following description of an example which utilizes the invention to advantage with reference to the drawings wherein.

DESCRIPTION OF THE PREFERRED EMBODIMENT

Figure 1:
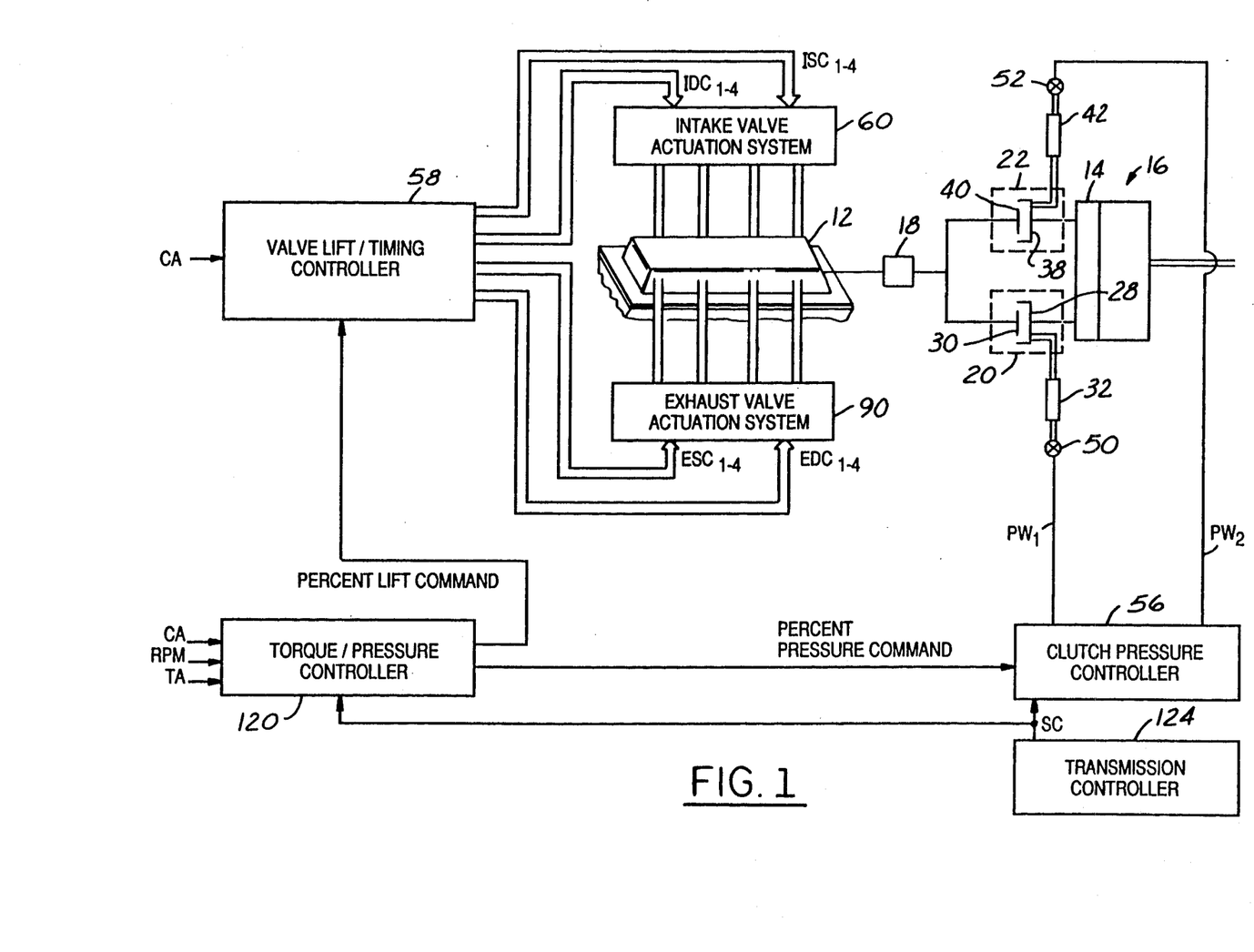
FIG. 1 is a block diagram of a system which utilizes the invention to advantage.

Referring first to FIG. 1, a schematic representation of a conventional-motor vehicle drivetrain is shown including internal combustion engine 12, having four cylinders each with an intake and exhaust valve, coupled to planetary gear system 14 of automatic transmission 16 via torque converter 18 and clutches 20 and 22. In simplified schematic form, clutch 20 is shown including clutch plate 28 which is driven against friction element 30 by action of hydraulic piston assembly 32. Similarly, clutch 22 is shown including clutch plate 38 which is driven against friction element 40 by hydraulic piston assembly 42. Solenoid valves 50 and 42 are shown respectively coupled to clutch plates 28 and 38 for applying a coupling force in direct relation to the pulsewidth of respective signals $PW_1$ and $PW_2$ from clutch pressure controller 56. Accordingly, clutch slippage and the resultant heat are a function of both the energy of signals $PW_{1-2}$ and torque transfer between engine 12 and transmission 16.

Although a simplified drivetrain is presented in this example for illustrative purposes, the invention described herein may be used to advantage with more complex drivetrains such as, for example, larger engines, four valve per cylinder engines, and transmissions having more than two clutches. In addition, only two clutches are shown for illustrative purposes whereas a conventional four speed automatic transmission may include six or more clutches.

As described in greater detail hereinafter with particular reference to FIGS. 2-4, intake valve actuation system 60 controls motion of intake valves $IV_{1-4}$ in response to inlet supply command signals $ISC_{1-4}$ and intake drain command signals $IDC_{1-4}$ from valve lift/timing controller 58. Similarly, exhaust valves $EV_{1-4}$ are controlled by exhaust valve actuation system 90 in response to command signals $ESC_{1-4}$ and $EDC_{1-4}$ from valve lift/timing controller 58. These command signals are dependent upon engine crank angle signal CA which is provided by a conventional crank angle sensor and associated circuitry (not shown). As described in greater detail later herein, they are also dependent upon percent lift command signal from torque/pressure controller 120. In response to the percent lift command signal, engine valves $IV_{1-4}$ and $EV_{1-4}$ will vary in lift (i.e., valve displacement and/or time duration of such displacement) from 0% to 100% with a corresponding variation in engine torque output.

For reasons described in greater detail later herein with particular reference to FIGS. 7A-I, torque/pressure controller 120 is responsive to: shift command signal SC from conventional electronic transmission controller 124; crank angle signal CA; engine speed signal RPM; and a signal indicative of engine load, shown as throttle angle signal TA in this particular example. During a transmission shift, torque/pressure controller 120 provides percent lift command signal to valve lift/timing controller 58 for reducing valve lift during a transmission shift as a function of engine speed and load. Concurrently, torque/pressure controller 120 provides an appropriate percent pressure command signal to clutch pressure controller 56 for reducing the pressure applied to the appropriate clutch being actuated. Accordingly, a smooth transmission shift is provided at all engine load and speed conditions without overheating the clutches.

Figure 2:
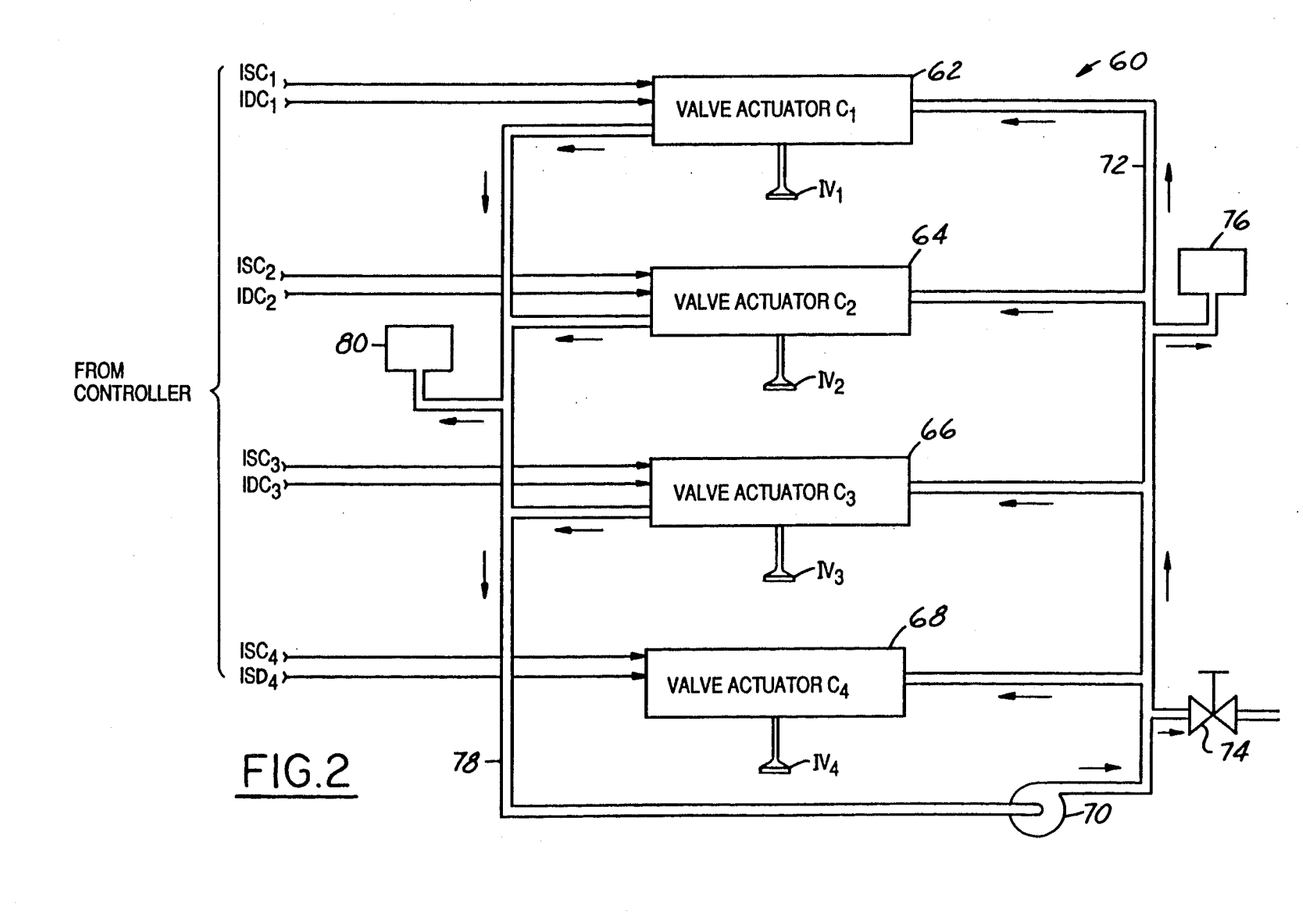
FIG. 2 is a more detailed block diagram of a portion of the inlet valve actuation system shown in FIG. 1.

Referring to FIG. 2, a block diagram of intake valve actuation system 60 is shown including valve actuator assemblies 62, 64, 66, and 68 connected to respective engine inlet valves $IV_1$, $IV_2$, $IV_3$, and $IV_4$. Variable displacement pump 70 is shown supplying pressurized hydraulic fluid to the intake valve actuator assemblies via supply line 72. Conventional relief valve 74 and high pressure accumulator 76 are also shown coupled to supply line 72. Pump 70 is shown receiving hydraulic fluid from the intake valve actuator assemblies via return line 78. Low pressure accumulator 80 is shown coupled to return line 78. As described in greater detail later herein, intake valve actuator assembly 62 is responsive to intake supply command $ISC_1$ and intake drain command signal $IDC_1$ from valve lift/timing controller 58. Similarly, valve actuator assemblies 64, 66, and 68 are responsive to respective command signals $ISC_2$, $IDC_2$, $ISC_3$, $IDC_3$, $ISC_4$, and $IDC_4$.

Figure 3:
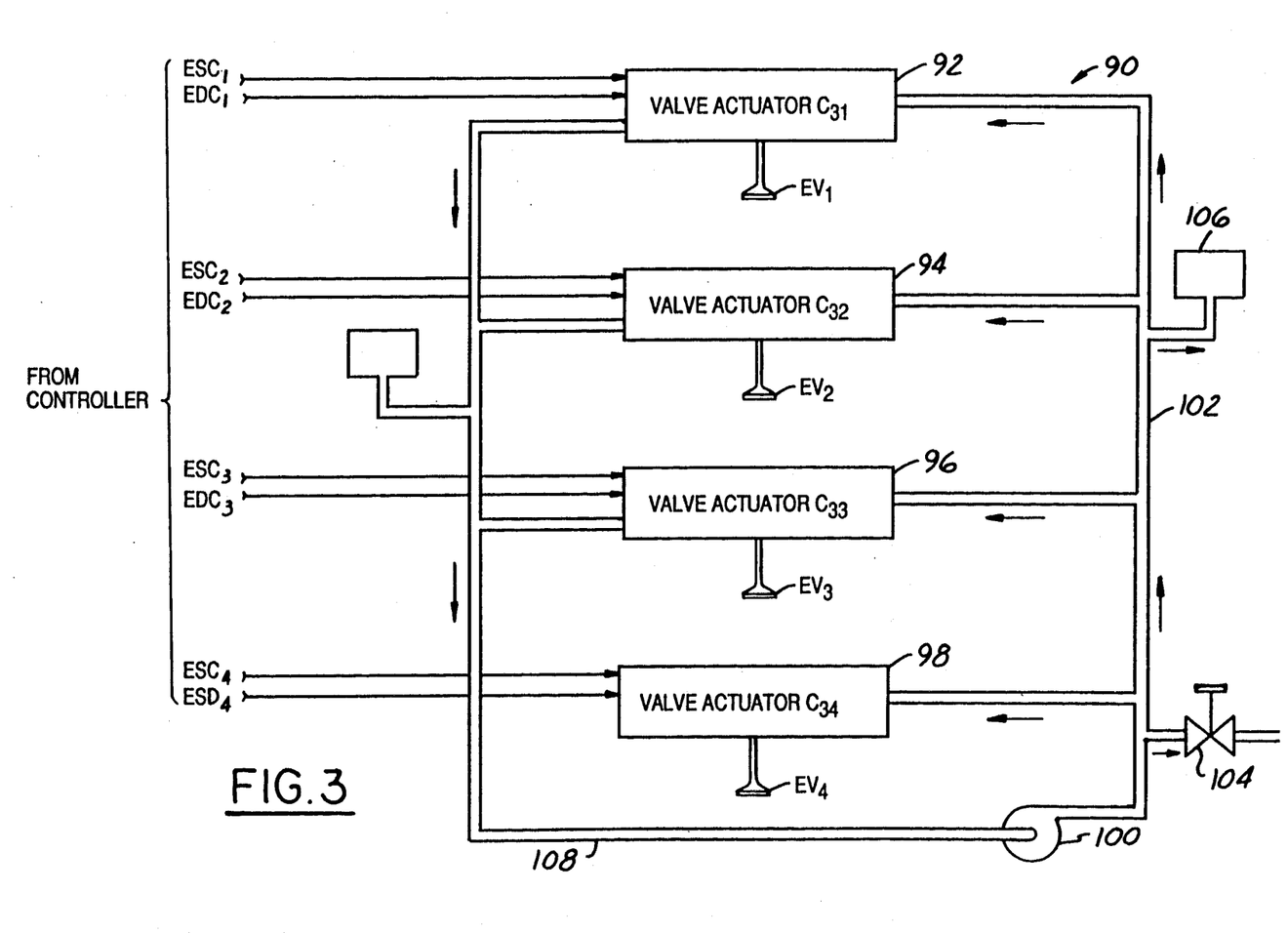
FIG. 3 is a more detailed block diagram of a portion of the exhaust valve actuation system shown in FIG. 1.

An optional exhaust valve actuation system 90 is shown in FIG. 3 having the same structure and operation as intake valve actuation system 70 which was previously described with reference to FIG. 2. Exhaust valve actuation system 90 is used to advantage when engine braking is desired (i.e., negative engine torque). Valve actuator assemblies 92, 94, 96, and 98 are shown connected to respective engine exhaust valves $EV_1$, $EV_2$, $EV_3$, and $EV_4$. Valve actuation assemblies 92, 94, 96, and 98 are responsive to respective command signals $ESC_1$, $EDC_1$, $ESC_2$, $EDC_2$, $ESC_3$, $EDC_3$, $ESC_4$, and $EDC_4$. Pump 100 is coupled to each valve actuator assembly via supply line 102 and return line 108. Supply line 102 is coupled to high pressure accumulator 106 and vent 104. Return line 108 is shown coupled to each valve actuator assembly and also coupled to low pressure accumulator 110.

Figure 4:
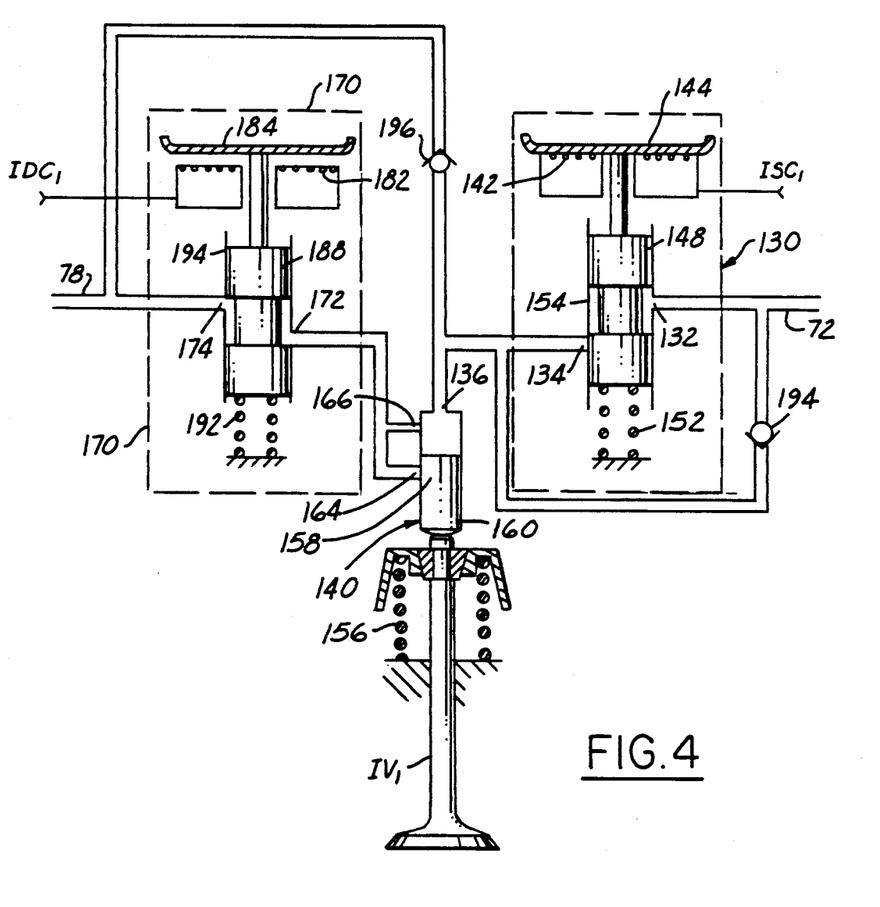
FIG. 4 is a schematic of the valve actuators shown in FIGS. 2 and 3.

Referring to FIG. 4, the structure and operation of the valve actuators is now described. Although a single valve actuator (62) is shown, the related description is applicable to valve actuators 64, 66, 68, 92, 94, 96 and 98. Valve actuator assembly 62 is shown including supply valve 130, hydraulic actuator 140, and drain valve 170. Supply valve 130, shown in this example as initially being in its closed position, includes fluid input 132 coupled to hydraulic supply line 72 and fluid output 134 coupled to fluid input 136 of hydraulic actuator 140. Supply valve 130 includes coils 142 responsive to intake supply command $ISC_1$ and electromagnetically coupled to armature 144. Spool valve 148 is shown coupled to both armature 144 and return spring 152 within casing 154. Accordingly, hydraulic supply line 72 is coupled to hydraulic actuator 140 when $ISC_1$ is not active.

Intake valve $IV_1$ is shown coupled between hydraulic actuator 140 and return spring 156. Hydraulic actuator 140 is shown including piston 158 positioned within chamber 160 and coupled to intake valve $IV_1$. Drain outlet 164 is shown coupled to chamber 160 downstream (with respect to piston stroke) of restricted drain outlet 166. Both drain outlet 164 and restricted drain outlet 166 are shown coupled to fluid input 172 of drain valve 170.

For the particular example presented in FIG. 4, drain valve 170 is shown in its normally open position. Fluid outlet 174 of drain valve 170 is shown coupled to hydraulic return line 78. Drain valve 170 is shown including coils 182 responsive to intake drain command $IDC_1$ and electromagnetically coupled to armature 184. Spool valve 188 is shown coupled to both armature 184 and return spring 192 within casing 194. Hydraulic actuator 140 is coupled to hydraulic return line 78 through drain valve 170 when intake drain command $IDC_1$ is not active.

As described in greater detail later herein with particular reference to FIG. 5, supply check valve 194 is shown coupled between hydraulic supply line 72 and fluid inlet 136 of hydraulic actuator 140 for energy recovery purposes. Drain check valve 196 is shown coupled between hydraulic return line 78 and fluid inlet 136 of hydraulic actuator 140 to prevent chamfering.

Figure 5:
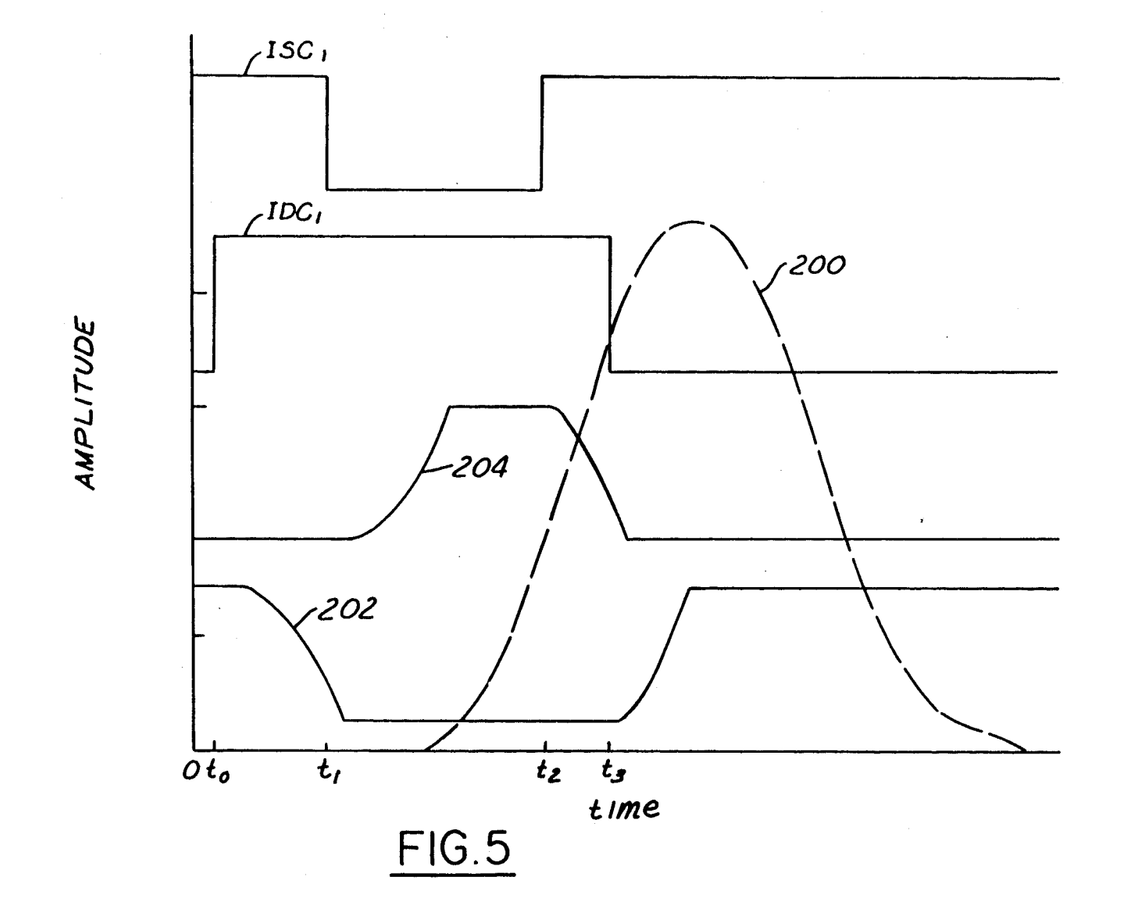
FIG. 5 schematically shows operation of a valve actuator and corresponding engine valve during full valve lift operation.

Operation of valve actuator assembly 62 is now described with continuing reference to FIG. 5 and reference to the waveforms shown in FIG. 5. It is noted that although operation is described with reference to intake valve actuator 62, the operation described herein is equally applicable to valve actuators 64, 66, 68, 92, 94, 96, and 98.

In this particular example, the relative timing and pulsewidth of command signals $ISC_1$ and $IDC_1$ are provided by valve lift/timing controller 58 to achieve full valve lift (as shown by dashed line 200 in FIG. 5). More specifically, command signal $IDC_1$ is shown becoming active at time $t_0$. In response, drain valve 170 moves from its normally open position to a closed position as shown by line 202. At time $t_1$, intake supply command $ISC_1$ changes to an inactive state for opening normally closed supply valve 144 as shown by line 204. As supply valve 130 opens, pressure builds in chamber 160 of hydraulic actuator 140 pushing down piston 158 and intake valve $IV_1$. Intake supply command $ISC_1$ changes back to its active state at time $t_2$ thereby isolating chamber 160 from hydraulic supply line 72. However, intake valve $IV_1$ continues its downward motion due to inertia thereby reducing pressure in chamber 160 below the pressure in hydraulic return line 78. In response, return check valve 196 opens enabling hydraulic fluid to enter chamber 160 from hydraulic return line 78 to reduce any potential fluid cavitation.

At time $t_3$ intake drain command $IDC_1$ is shown changing to an inactive state for opening normally open drain valve 170 as shown by line 202. The closing of drain valve 170 is timed to approximately correspond with peak excursion of intake valve $IV_1$. As intake valve $IV_1$ moves towards a rest position by action of return spring 156, its motion is restrained by action of the corresponding pressure accumulation in chamber 160. This pressure accumulation, and resulting restraining force, is increased as piston 158 moves past drain opening 164 towards restricted drain opening 166 in chamber 160. Accordingly, a desired lift return profile (line 200) is obtained by judicious selection of both drain opening 164 and restricted drain opening 166 rather than by reliance only on the spring force of return spring 156 as is the case with prior approaches. Stated another way, drain opening 164 and restricted drain opening 166 are utilized as damping orifices for damping return motion of intake valve $IV_1$ in a desired manner.

Figure 6:
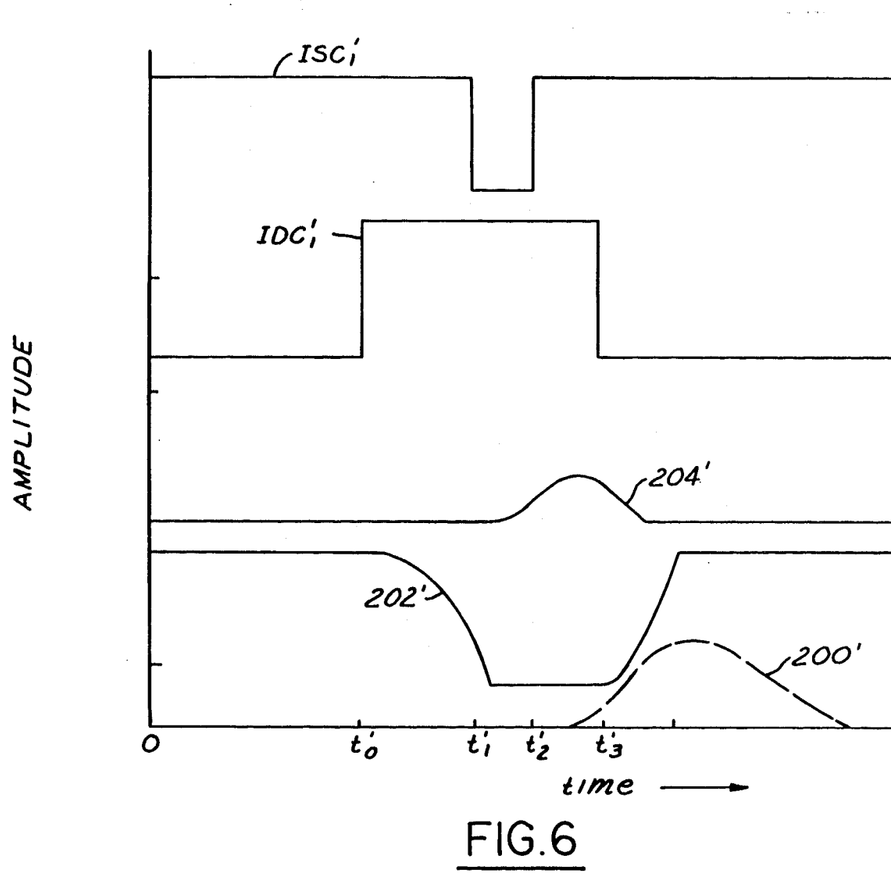
FIG. 6 schematically shows an example of operation of a valve actuator and corresponding engine valve during reduced valve lift operation.

Referring to FIG. 6, wherein like numerals referred to like representation shown in FIG. 5, an example of operation is presented for achieving a substantial reduction in valve lift. As described previously herein with particular reference to FIG. 1, valve lift reduction is initiated during a transmission shift to reduce engine torque output during the shift. In this particular example, valve lift (200') is centered at approximately the same timing position as the full lift operation shown by line 200 in FIG. 5. Intake supply command $ISC_1'$ and intake drain command $IDC_1'$ are shown delayed in time and reduced in pulsewidth from the operation schematically shown in FIG. 5. The resulting operation of supply valve 130 and drain valve 170, are shown by respective lines 204' and 202' in FIG. 6. In response to the depicted operation of supply valve 130 and drain valve 170, the operation of valve actuator 62 proceeds in a similar manner to that previously described herein with particular reference to FIG. 5 for achieving the reduced lift profile shown by line 200' in FIG. 6.

Referring to FIGS. 7A-I, and also referring back to FIG. 1, the operation end effect of the invention in controlling the motor vehicle drivetrain during an automatic transmission shift is now described. Solid lines shown in FIGS. 7A-I illustrate drivetrain operation with both valve lift and pressure control whereas the illustrated dashed lines show operation without such control.

In response to a shift command (FIG. 7A) from electronic transmission controller 124, torque/pressure controller 120 provides both a percent lift command signal (FIG. 7B) and percent pressure command signal (FIG. 7C) as a function of engine speed (RPM) and load (TA). For the particular example presented herein at approximately 6000 RPM, the percent lift command signal commands valve lift/timing controller 58 to reduce valve lift by approximately 60% for a corresponding reduction in engine torque of approximately 50% (solid line FIG. 7D). Concurrently, the percent lift command signal commands clutch pressure controller 56 to reduce clutch pressure by approximately 40% (solid line FIG. 7E). For this particular example, an automatic shift is accomplished by decoupling clutch 22 and coupling clutch 20. Thus, the $PW_2$ signal is set to 0, and the $PW_1$ signal is provided having a pulsewidth of 60% of its maximum valve.

It is noted that these particular values of engine lift and applied pressure are presented only for illustrative purposes. The percent lift command signal and percent pressure command signal are varied as a function of engine operation in a manner to prevent overheating of the clutch elements by controlling clutch slippage without sacrificing the operators perception of shift quality. It is also noted that engine torque output is also reduced by varying the duration of valve lift as shown in FIG. 6.

Figure 7A:
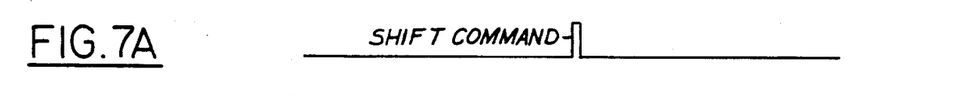
FIGS. 7A-I schematically show operation of the drivetrain shown in FIG. 1 during an automatic transmission shift.
Figure 7B:
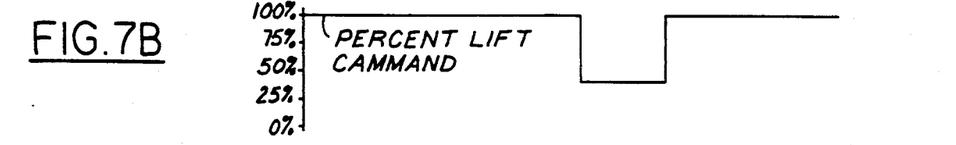
Figure 7C:
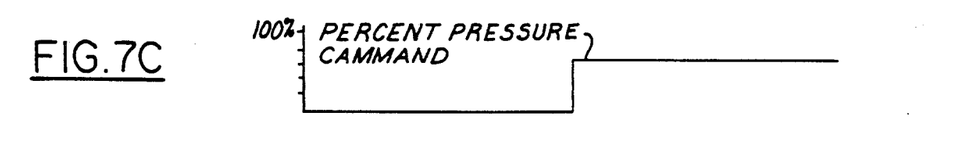
Figure 7D:
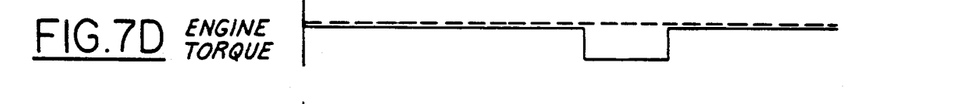
Figure 7E:
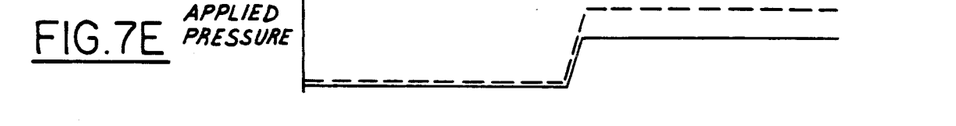
Figure 7F:
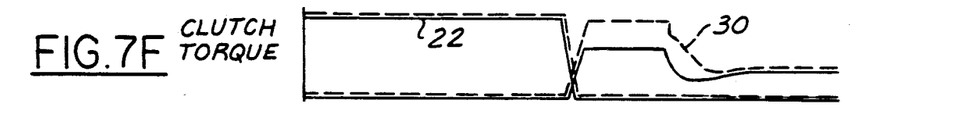
Figure 7G:
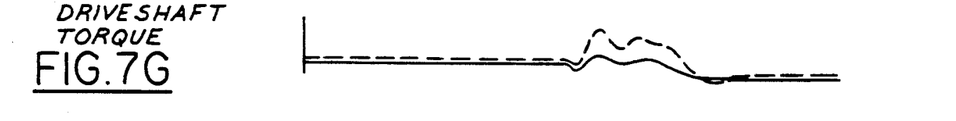
Figure 7H:
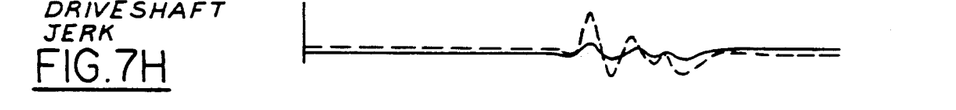
Figure 7I:
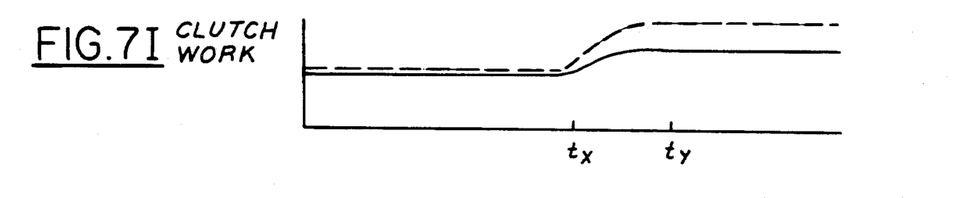

Referring to FIG. 7F, clutch torque is schematically shown for both offgoing clutch 22 and oncoming clutch 20. During the time interval $t_x-t_y$, inertia slippage of clutch 20 occurs with a corresponding heat build up in the clutch elements. By reducing engine torque applied to clutch 20 during this time interval (solid line as compared to the dashed line in FIG. 7F), the corresponding clutch work (integral of slippage times torque) is reduced as shown by comparing the solid and dashed lines in FIG. 7I. Accordingly, the heat build up on clutch elements is reduced to a desired amount by the engine valve lift control previously described. In addition, to control drive shaft jerk and the operators corresponding perception of shift quality, pressure applied to clutch 20 is concurrently controlled as previously described herein. Without such pressure control, engine torque reduction alone would result in a faster shift and an undesired increase in drive shaft jerk. Drive shaft torque and corresponding jerk are shown in respective FIGS. 7G and 7H for a case of full control utilizing both torque and pressure control (solid line) and a case having zero control (dashed line). The dramatic improvement in shift quality by utilizing both lift and pressure control are readily apparent by the representations shown in FIGS. 7G and 7H.

This concludes the Description of the Preferred Embodiment. The reading of it by those skilled in the art will bring to mind many alterations and modifications without departing from the spirit and scope of the invention. For example, the degree and timing of both lift and pressure control will vary dependent upon engine operation and the particular drivetrain in which the invention is used to advantage. Further, valve lift control is accomplished by lift displacement and/or lift duration. In addition, the intake valves and/or exhaust valves are controllable. Accordingly, it is intended that the scope of the invention be limited only by the following claims.

What is claimed:

1. An apparatus for controlling a drivetrain during an automatic transmission shift, comprising:
    a plurality of actuation means each coupled to a hydraulic fluid source and each coupled to an individual engine valve for electronically controlling valve lift, said actuation means comprising a hydraulically operated piston coupled to each of said engine valves, and an electronically actuated valve responsive to signal and coupled between said hydraulically operated piston and said source of hydraulic fluid;
    transmission control means for providing a shift command correlated with the automatic transmission shift; and
    control means responsive to said shift command for providing said signal to appropriately reduce valve lift during said automatic transmission shift.

2. The apparatus recited in claim 1 wherein said control means is also responsive to engine speed.

3. The apparatus recited in claim 1 wherein said control means is also responsive to engine load.

4. The apparatus recited in claim 1 further comprising a first check valve connected in parallel with an electronically actuated supply valve.

5. The apparatus recited in claim 1 further comprising a second check valve connected in parallel with said electronically actuated valve.

6. An apparatus for controlling a drivetrain during a shift of an automatic transmission having a plurality of hydraulically operated clutches coupled to the engine, comprising:
    a plurality of actuation means each coupled to an individual engine valve for electronically controlling valve lift in relation to a command signal, said actuation means comprising a hydraulically operated piston coupled to each of said engine valves and an electronically actuated valve responsive to said command signal coupled between said hydraulically operated piston and a source of pressurized hydraulic fluid;
    coupling means for hydraulically coupling the clutches in proportion to a value of a pressure command signal;
    transmission control means for providing a shift command correlated with the automatic transmission shift;
    valve control means responsive to said shift command for providing said command signal in relation to a desired reduction in valve lift during the automatic transmission shift; and
    clutch control means responsive to said shift command for providing said pressure- command to control coupling between the clutches during the automatic transmission shift.

7. The apparatus recited in claim 6 further comprising a torque controller responsive to said shift command and an indication of engine load and an indication of engine speed for controlling both said valve control means and said clutch control means.

* * * * *